US012604968B2

(12) United States Patent
    Layton

(10) Patent No.: US 12,604,968 B2
(45) Date of Patent: Apr. 21, 2026

(54) PORTABLE CUSTOM COSMETIC PIGMENT DISPENSER

(71) Applicant: BoldHue, Inc., Aurora, CO (US)

(72) Inventor: Karin Layton, Aurora, CO (US)

(73) Assignee: BoldHue, Inc., Aurora, CO (US)

( * ) Notice: Subject to any disclaimer, the term of this patent is extended or adjusted under 35 U.S.C. 154(b) by 534 days.

(21) Appl. No.: 17/815,830

(22) Filed: Jul. 28, 2022

(65) Prior Publication Data

US 2022/0362728 A1     Nov. 17, 2022

Related U.S. Application Data

(63) Continuation of application No. 16/537,606, filed on Aug. 11, 2019, now Pat. No. 11,406,952.

(60) Provisional application No. 62/717,874, filed on Aug. 12, 2018.

(51) Int. Cl.
    *A45D 40/24*     (2006.01)
    *A45D 44/00*     (2006.01)
    *B01F 33/84*     (2022.01)
    *B01F 101/21*    (2022.01)
    *G06V 10/56*     (2022.01)
    *G06V 40/16*     (2022.01)

(52) U.S. Cl.
    CPC ............ *A45D 40/24* (2013.01); *B01F 33/848* (2022.01); *G06V 10/56* (2022.01); *G06V 40/162* (2022.01); *A45D 2044/007* (2013.01); *B01F 2101/21* (2022.01)

(58) Field of Classification Search
    CPC .. B01F 33/848; B01F 2101/21; B01F 33/841; B01F 33/844; B01F 35/71805; G06V 40/162; G06V 10/56; A45D 2044/007; A45D 40/24; A45D 2304/005; A45D 34/00; A45D 2200/058; A45D 44/005
See application file for complete search history.

(56) References Cited

U.S. PATENT DOCUMENTS

| | | | |
|---|---|---|---|
| 5,903,465 A | 5/1999 | Brown | |
| 6,177,092 B1 | 1/2001 | Lombardi et al. | |
| 6,510,366 B1 | 1/2003 | Murray et al. | |
| 7,963,303 B2 | 6/2011 | Saranow et al. | |
| 8,564,778 B1 | 10/2013 | Igarashi | |
| 8,588,963 B2 | 11/2013 | Samain | |
| 8,636,173 B2 | 1/2014 | Bartholomew et al. | |
| 8,666,540 B2 | 3/2014 | Milhorn | |
| 8,688,268 B2 * | 4/2014 | Samain ............... | B01F 33/8442 |
| | | | 700/239 |
| 8,830,468 B2 | 9/2014 | Igarashi | |
| 8,977,389 B2 | 3/2015 | Witchell et al. | |
| 9,007,588 B1 | 4/2015 | Igarashi | |
| 9,205,283 B2 | 12/2015 | Miklatzky et al. | |

(Continued)

*Primary Examiner* — Michael Collins

(74) *Attorney, Agent, or Firm* — Perkins Coie LLP; Alberto Araiza; Anni Siitonen

(57)     ABSTRACT

A portable custom cosmetic pigment dispenser creates a cosmetic pigment mixture that closely matches a person's skin color. The device is constructed with a color sensor at one end that scans the skin and records color values in a color space. A processor converts the color values into a colorspace. In one example, a user is presented with a sample of the color as determined by the processor and has an opportunity to accept or modify the color. Specific quantities of colored pigment are selected based on the corresponding weightings in the color space.

19 Claims, 6 Drawing Sheets

(56) References Cited

U.S. PATENT DOCUMENTS

|  |  |  |  |  |
|---|---|---|---|---|
| 9,808,071 | B2 * | 11/2017 | Thiebaut | B05B 11/0054 |
| 9,858,685 | B2 | 1/2018 | Nichol et al. | |
| 10,206,478 | B1 * | 2/2019 | Macedo | G05B 15/02 |
| 10,521,900 | B2 * | 12/2019 | Bartula | A61B 5/14551 |
| 10,925,377 | B2 * | 2/2021 | Samain | B05B 7/2402 |
| 11,076,683 | B2 | 8/2021 | Wiltord et al. | |
| 2006/0108247 | A1 | 5/2006 | Liechty et al. | |
| 2011/0288680 | A1 * | 11/2011 | Samain | B01F 33/84 |
| | | | | 700/239 |
| 2012/0169253 | A1 * | 7/2012 | Rolston | H04N 23/70 |
| | | | | 315/297 |
| 2014/0192177 | A1 * | 7/2014 | Bartula | G06T 7/0016 |
| | | | | 348/77 |
| 2016/0082403 | A1 | 3/2016 | Ounzar | |
| 2016/0107133 | A1 * | 4/2016 | Sugino | G01N 21/25 |
| | | | | 366/142 |

* cited by examiner

100

13

50

PORTABLE CUSTOM COSMETIC PIGMENT DISPENSER

CROSS-REFERENCE TO RELATED APPLICATIONS

This application is a continuation of, and claims priority under 35 U.S.C. § 120 to, U.S. patent application Ser. No. 16/537,606, filed Aug. 11, 2019, which claims the benefit of U.S. Provisional Application No. 62/717,874, filed on Aug. 12, 2018, the subject matter of which is incorporated herein by reference.

TECHNICAL FIELD

The present disclosure relates generally to cosmetics and cosmetic applicators, and more particularly to a portable custom cosmetic pigment dispenser.

BACKGROUND

There are a variety of cosmetics on the market formulated to match skin colors. Many cosmetic companies provide a vast array of cosmetics categories like foundation, conceal-ers and highlighters in numerous pigment choices to try to accommodate those many skin colors.

The problems with the variety of manufactured cosmetic pigments is that it can never quite match a person's true skin color. Skin colors come in an innumerable variety. Ethnicity showcases a distinctive range of hues. A person's ancestral genomes can mix racial skin colors giving unique shades to that individual. Seasonal changes, exposure to the sun and skin pigment disorders can create a discoloration of skin colors over time. Even with the array of cosmetics and pigments to choose from, not every person's skin can have a cosmetic match that is truly adapted to their singular dermal coloration.

SUMMARY

The present disclosure, as briefly described, is a portable custom cosmetic pigment dispenser used to provide cos-metic pigmentation that will closely match a person's skin color. The device is constructed with an RGB sensor at one end that scans the skin and records it in the RGB color space. A processor converts the RGB information into a CYMK+W color space. In an embodiment, a user is presented with a sample of the color as determined by the processor, and has an opportunity to accept or modify the color. Specific quantities of colored pigment are selected based on the corresponding weightings in the CYMK+W space.

DETAILED DESCRIPTION OF EXAMPLE EMBODIMENTS

Figure 1:
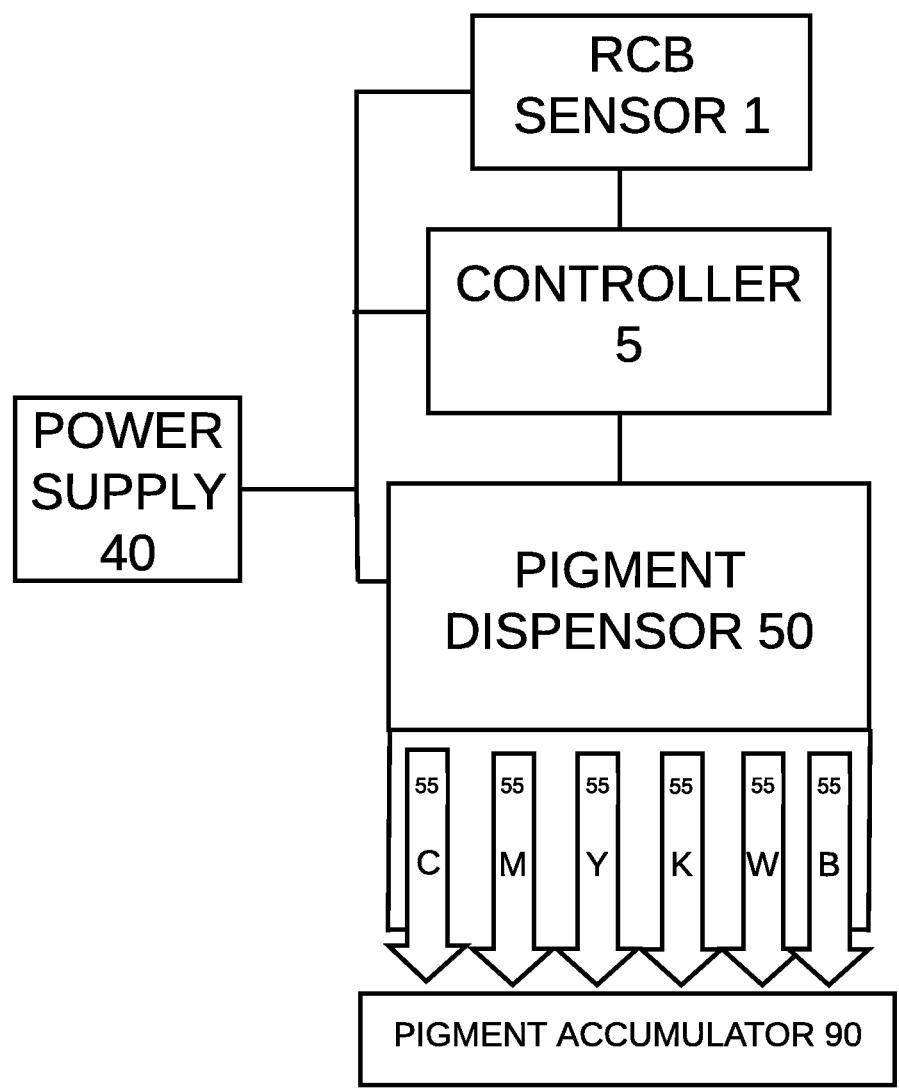
FIG. 1 shows an example block diagram illustrating the components of an example portable custom cosmetic pig-ment dispenser, according to an example embodiment of the disclosure.

Referring to FIG. 1 a block diagram showing the com-ponents of an example portable custom cosmetic pigment dispenser 100, according to example embodiments of the disclosure, is illustrated. The block diagram includes an RGB (red, green and blue) sensor 1, a controller 5, a user interface 15, a pigment dispenser 50, a pigment accumulator 90, and a power supply 40. As will be described in greater detail, the portable custom cosmetic pigment dispenser 100 is a hand-held device that is used to determine a user's skin color using the RGB sensor 1, determine a mixture of colored cosmetic pigments that will closely match the user's skin color when mixed together, and dispense the individual colored cosmetic pigments into a pigment accumulator. The dispensed colored cosmetic pigments in the pigment accu-mulator will then be mixed together to arrive at a cosmetic that closely matches the user's skin color.

In operation, the user can interact with the device by utilizing the user interface 15. The user interface 15 can include an LCD display 11 for output and a plurality of input buttons 8-10 (as shown in FIG. 1), for example. However, the user interface 15 could alternatively, or additionally, include a variety of mechanical knobs, dials, and switches; a touchscreen; voice recognition, etc., to interface with the user. The user interface 15 is operatively connected to the controller 5, which in turn is operatively connected to the RGB sensor 1 and the pigment dispenser 50. In embodi-ments, when the user employs the custom cosmetic pigment dispenser 100, the user will be prompted (using the user interface 15) to place the top tip of the custom cosmetic pigment dispenser 100 adjacent the user's skin where the cosmetic is to be applied such that the RGB sensor 1 can scan the user's skin coloration. RGB sensors are known in the art, and typically will include an LED light or the like, an RGB color filter, and color sensing photodiodes. In general, a white light from the LED is displayed on an object, and the reflected light is passed through the RGB color filter such that red, green and blue colors are filtered. The color photodiodes convert the colored lights to current. This current, in the RGB color space, is a voltage measure-ment. Digital values for each of the colors (red, green, blue) can then be computed by an internal microprocessor (or the controller 5) and outputted. These values are usually six-digit hexadecimal (hex) values where digits 1-2 represent the intensity of red, digits 3-4 represent the intensity of green, and digits 5-6 represent the intensity of blue. Intensity is measured from decimal 0 (least) to 255 (or 00 hex to FF hex). As an example, the hex value A52A2A corresponds to a particular shade of brown. In this case, 'A5' (165) is the intensity of red, and '2A' (42) is the intensity of both green and blue in the mixture.

Continuing with FIG. 1, the controller 5 receives the outputted digital values from the RGB sensor 1, and con-verts the RGB values to a CMYK+W (cyan, magenta, yellow, black, and white) color scale for a more appropriate color. In this case, a value relating to an amount or percent-age of each of the color components is computed such that when the colored pigments are mixed together the result will closely match the subject's true skin color. In general, the intensity value of the color component will reflect the weighting of the color component in the mixture. However, changes to the weighting formula can and will likely have to be made, particularly where colors need to be lightened or darkened. Color scale conversions can be achieved using an appropriate table lookup or a conversion formula. Conversions from an RGB scale to CMYK scale are known in the art and understood. However, these conversions typically are designed for printing applications with colored ink on a white paper background. As such, white or lighter colors are conventionally achieved by simply leaving some pixels without ink. Accordingly, the present disclosure provides for white pigment to be added to the mixture as appropriate. Additionally, other changes in color component weighting deviating from an existing table or formula can be made if desired so as to obtain a more realistic skin color. A percentage, ratio or amount of each of the pigment colors is thereupon determined. The controller 5 can include a micro-controller or programmable logic controller (PLC), for example. The controller 5 is capable of storing data and instructions in non-transitory memory, such as read-only memory (ROM) and/or programmable read-only memory (PROM). The controller 5 can be programmed in a variety of programming languages. If the controller 5 includes a standard microprocessor, languages such as C or C# can be used. If the controller 5 is a PLC, it can be programmed in a language adhering to the EC 61131-3 international standard for programmable controller programming languages.

Staying with FIG. 1 the calculated CMYK+W weightings can now be used to command the pigment dispenser 50 to dispense individual quantities of colored pigments stored in separate pigment reservoirs. However, before this is done, in an embodiment, the user is shown a sample of the color of the cosmetic that will be created. This can be done by displaying a color bar or the like of the color formulated based on the individual color weightings. The user can further be given the opportunity to approve the shown color, and only if approval is indicated, the controller 5 will instruct the pigment dispenser 50 to dispense the proper amounts of colored pigments. In some embodiments, the user is further provided with the ability to modify the color such as to lighten or darken it, or to adjust the hue. There are numerous ways in which the cosmetic pigment dispenser 50 can be realized. In general, the controller 5 can be electrically connected to each of the individual pigment color reservoirs 55 so that upon an "open" command or the like, a respective reservoir valve will be opened to dispense a determined quantity of colored pigment. The controller 5 can time the individual valve openings to remain open a length of time proportional to the respective weightings. For example, if a weighing for a first pigment color is 10% and a second pigment color 20%, the valve for the reservoir holding the second pigment color will stay open twice as long as the valve of the reservoir holding the first pigment color allowing twice the amount of the second pigment color to be dispensed than the first pigment color (assuming the rate of flow is the same). The valves can be closed upon issuance from the controller 5 of a "close" command or the like. The valve can be operated using a solenoid, for example. However, there are other ways to dispense the color pigments. As an alternative, the pigment could be "pushed" through a conduit using a pushing device (e.g., an actuator). In this case, the controller would command the pushing device to "start" and "finish" instead of "open" and "close". Depending on diameter size, the conduit could include a needle-type nozzle. If a solenoid is used, a microengineered solenoid can be provided. Once dispensed, the colored pigments are deposited into a pigment accumulator 90 that can be agitated and mixed together to create the matched skin color. This can be accomplished by shaking or stirring the device by hand or, in some embodiments, by way of a mechanical mixer, as examples.

Because the portable custom cosmetic pigment dispenser 100 makes use of various electronic components, the power source 40 is provided. The power source 40 preferably includes a rechargeable lithium-ion battery of sufficient voltage (but other types of batteries may suffice). Alternatively, or additionally, the custom cosmetic pigment dispenser 100 may operate using a wall plug. In this case, the power supply 40 would include an appropriate AC/DC converter.

Figure 2:
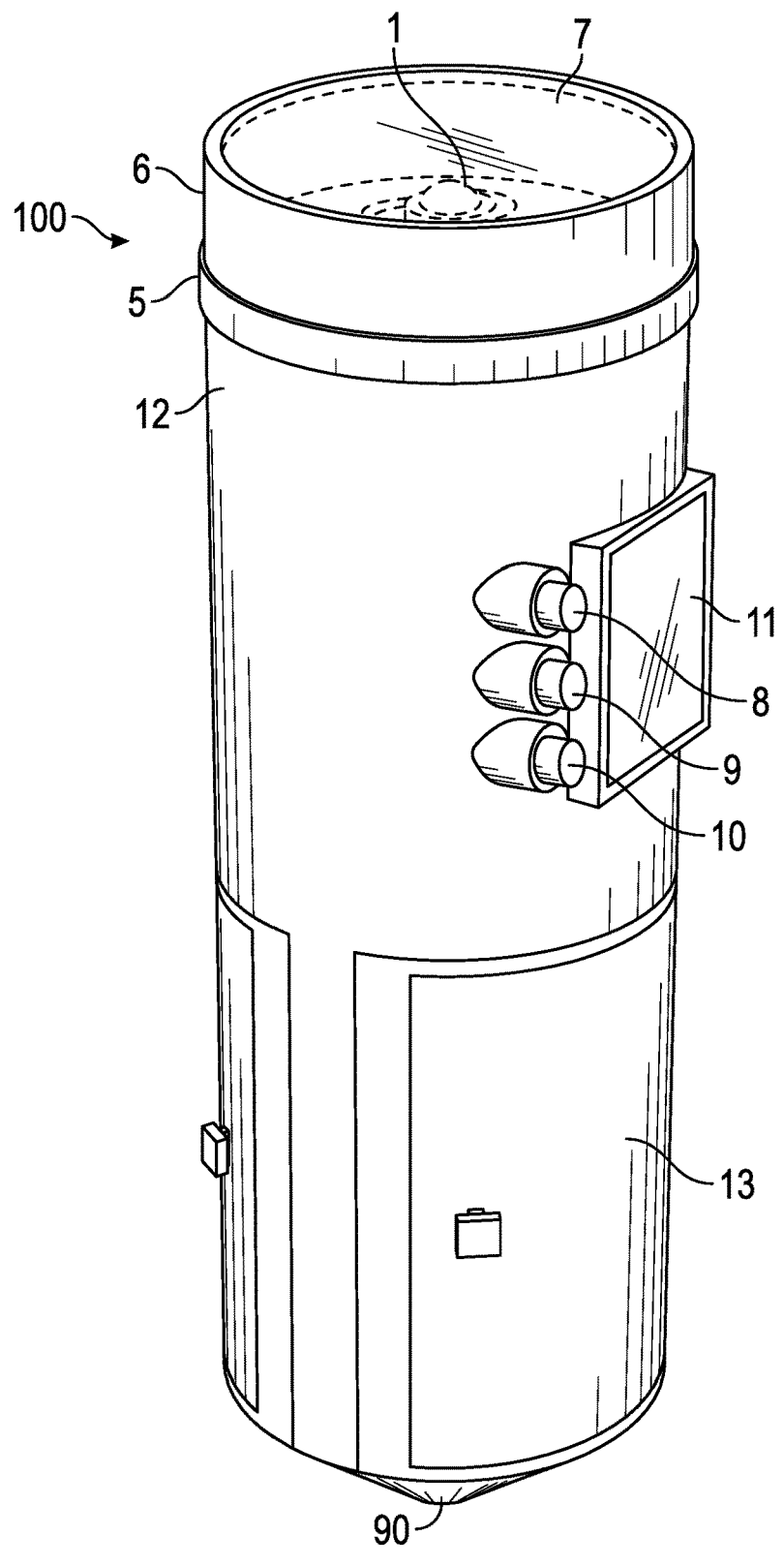
FIG. 2 shows a perspective view of an example portable custom cosmetic pigment dispenser, according to an example embodiment of the disclosure.

FIG. 2. Illustrates one example embodiment of the portable cosmetic pigment dispenser 100. Preferably, the portable cosmetic pigment dispenser 100 and its corresponding components are made of durable, corrosive-resistive materials such as metals, plastics, glass, or other known materials or composites. The shape, size and dimensions of the portable cosmetic pigment dispenser 100 can vary so long as hand-held portability is practical. The RGB sensor 1 is housed in a hollow body portion at a distal end 6 of the device 100. A clear or opaque cover 7 is disposed on one of the distal ends 6 of the portable custom cosmetic dispenser. The processor 5 can be disposed in a nearby area. The LED light from the RGB sensor 1 shines on the subject's skin and the intensity values for each of the red, green, and blue portions of the reflected light are calculated in the RGB sensor 1. The controller 5 is mounted just below the RGB sensor 1.

Continuing with FIG. 2, the lower main body 12 of the device 100 shows additional external features. A plurality of buttons 8, 9, and 10 are situated on the exterior of the lower main body 12 and are pushed to initiate the scanning and operational function of the device 100, as referred to the discussion relating to FIG. 1 supra. When the portable cosmetic pigment dispenser 100 is activated, a liquid crystal display (LCD) screen 11, also on the main lower body 12, will prompt the user on instructions to use the device 100. Once the device 100 is activated, the distal portion 6 is placed adjacent the skin and the scanning is performed. That data is collected in the RGB sensor 1 and passed to the controller 5 is converted into the CMYK+W color scale.

A plurality of access doors 13 are fastened in any known way to the lower main body 12 to allow admission to the inner mechanisms of the portable cosmetic pigment dispenser 100. This illustrated embodiment shows the portable cosmetic pigment dispenser 100 with the access doors 13 closed. At the bottom of the device 100, the pigment accumulator 90 will collect and allow for agitation of the CMYK+W after the calculated amounts are distributed from the syringe assembly of the pigment dispenser 50.

Figure 3:
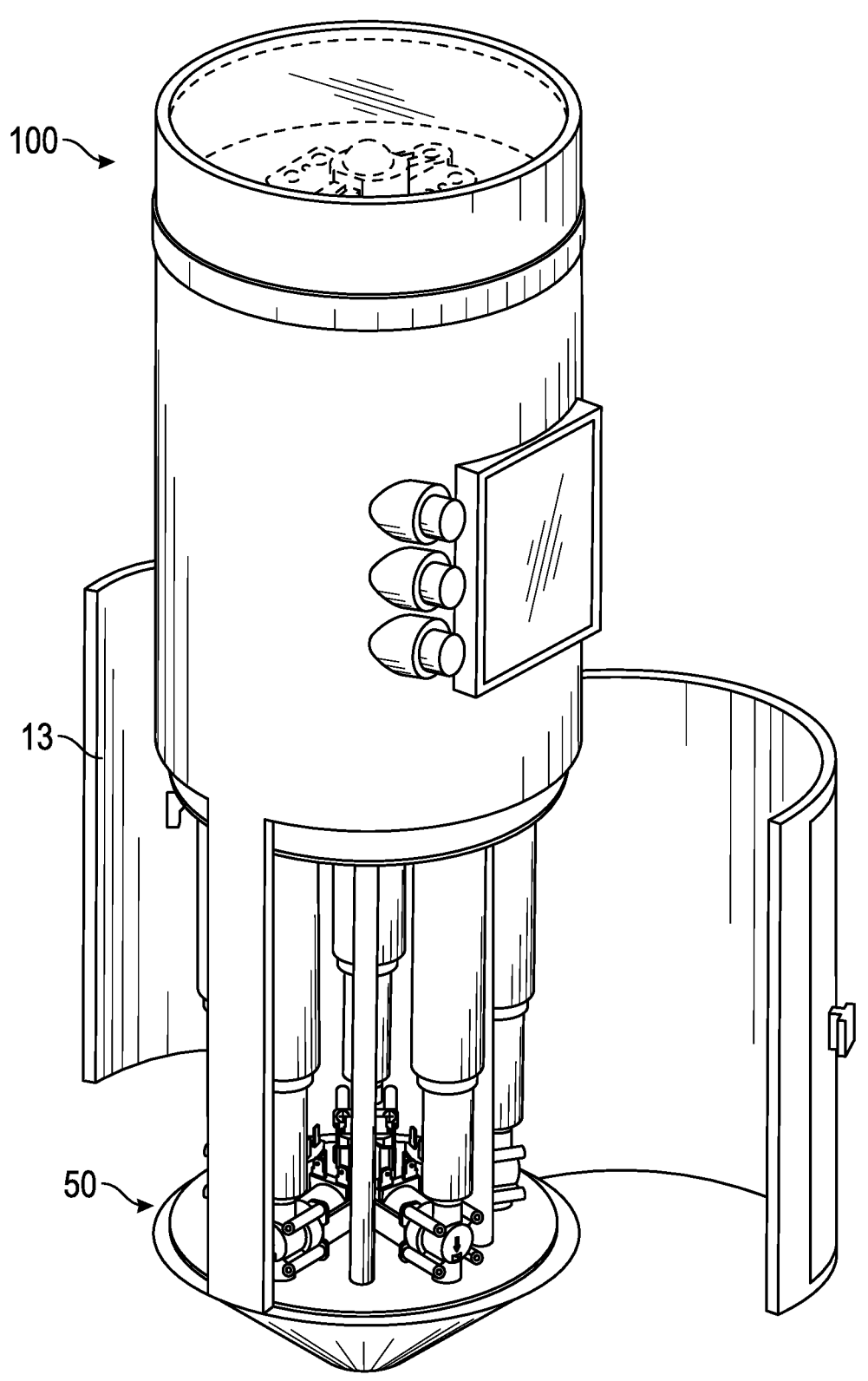
FIG. 3 shows a perspective view of the of the portable custom cosmetic pigment dispenser in a partially open state, according to an example embodiment of the disclosure.

FIG. 3 illustrates the completely assembled device 100 with the access doors 13 open to reveal the complete syringe assembly of the pigment dispenser 50.

Figure 4:
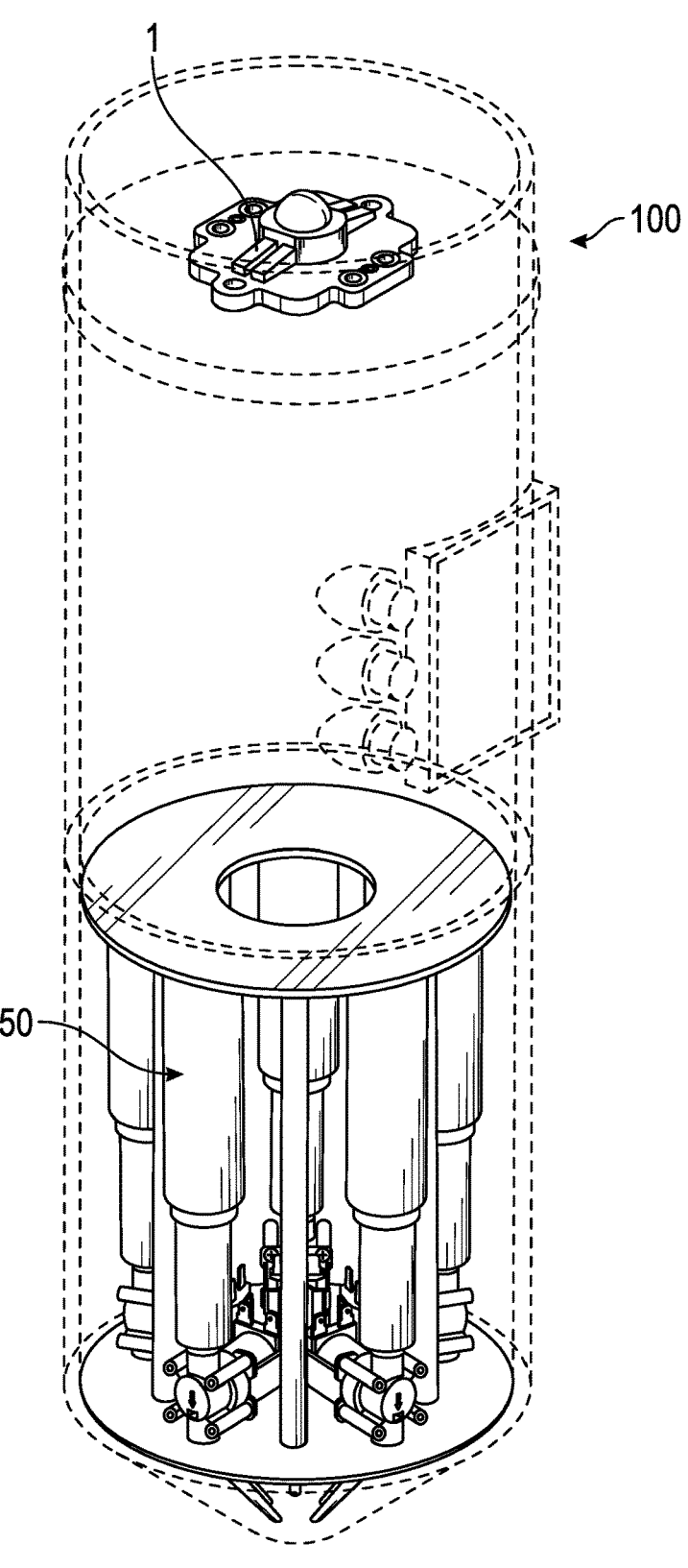
FIG. 4 shows a transparent perspective view of the portable custom cosmetic pigment dispenser, according to example embodiments of the disclosure.

FIG. 4. Illustrates a transparent view of the device 100 showing the placement of the RGB sensor 1 with the distal end portion 6. FIG. 4 also shows how the complete syringe assembly will rest within the lower main body 12 with the access doors 13 closed.

Figure 5:
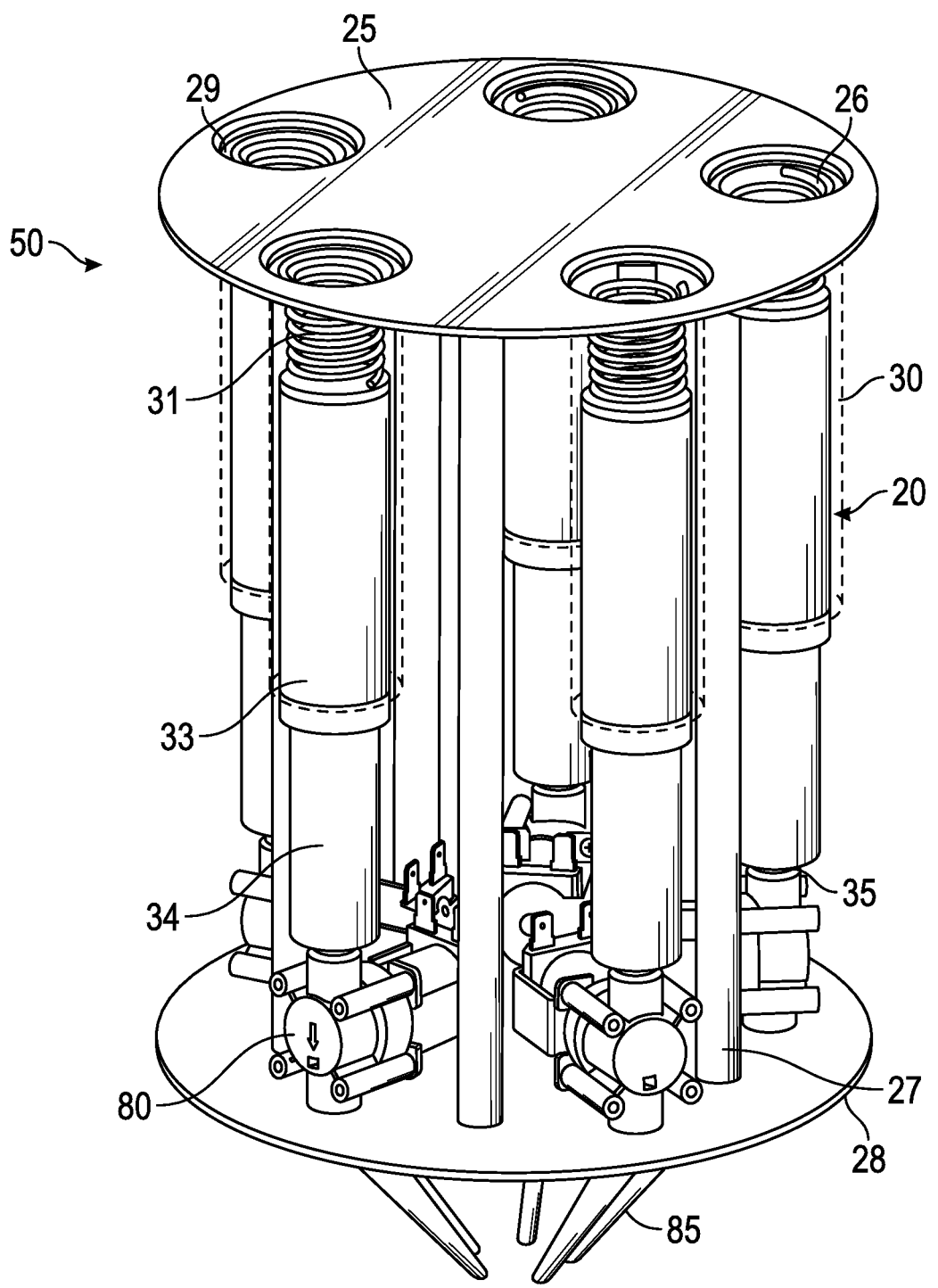
FIG. 5 shows a perspective view of the of a pigment dispenser assembly, according to example embodiments of the disclosure.

FIG. 5 illustrates a more detailed view of the pigment dispenser 50 which rests just below the hollow body distal end 6. The pigment dispenser 50 is made of a series multiple single syringe assembly pieces 20 that are the cosmetic reservoirs. The plurality of multiple single syringe assembly pieces 20 are held in a frame that has an upper portion 25 and lower portion 28 each with a plurality of holes 26 to secure a plurality of single syringe assemblies 20 at the syringes' 20 apex. The upper and lower portions of the frame 25 are secured to each other by a plurality of columns 27. FIG. 5 shows a solenoid valve 80 as a regulatory motor used to control the distribution of the colored pigments that are forced through the cosmetic distribution tip 35. Such solenoid valve 80 can be found on the market or custom made, and are known in the art, but other types of devices such as actuators or other motors can be used. The signal from the controller 5 will determine the amount of CYMK+W is needed to match the skin color of the individual scanned by the RGB sensor 1. In operation of solenoid valves 80, when a signal is sent by the processor 5 giving the mathematically calculated amounts of CYMK+W needed to make a skin color match, the solenoid valves 80 can regulate how much of each color to distribute. For colors that are needed, the solenoid valve can 80 determine the proper amount of pigment to dispense by various calculated means. The solenoid valve 80 can regulate the time the valve is open if a pre-determined amount can be sprayed per microsecond or other means of control. The valve can regulate the pigment distribution by a signal from the controller 5 and can work in conjunction with the plunger 33 commands. The plunger 33 and solenoid valve 80 can work in tandem to give a more accurate distribution of the calculated pigment amounts to match the scanned skin color.

A plurality of cosmetic collection channels 85 are attached to the bottom of each plurality of solenoid valves 80. The cosmetic collection channels can now move the measured cosmetics to the pigment accumulator 90, which can mix the measured CYMK+W for application to the skin.

Figure 6:
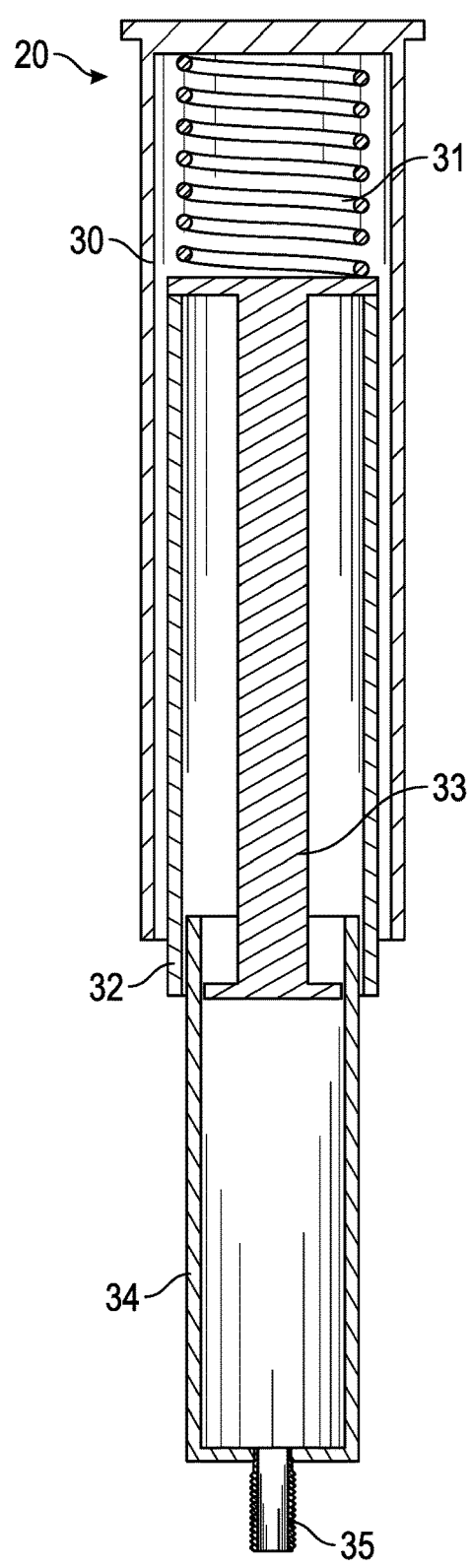
FIG. 6 shows a cross-sectional side view of a single syringe assembly, according to example embodiments of the disclosure.

FIG. 6 illustrates a cross-sectional view of the single syringe assembly piece 20 revealing multiple parts. A spring 31 is coiled and rests within the spring housing 30. The spring 31 maintains constant pressure on the plunger 33 apex. The plunger 33 rests in the plunger housing 32 with the bottom portion of the plunger 33 configured to the cosmetic housing 34. Once the signal for the controller 5 is sent to open the solenoid valve, the spring 31 uncoils and pushes the plunger 33 downwardly in the cosmetics housing. If a pigment is not needed then either no signal would be sent or a command to stay closed could be sent, or any other electronic message can be utilized to control how the plunger 33 can be controlled by the controller 5. As the plunger drops into the cosmetic housing 34, any one of the CYMK+W pigments that is in the cosmetic housing can now be forced through cosmetic distribution tip 35. The distribution tip 35 should be connected to a solenoid valve 80 that would be used to regulate the flow of cosmetic to be mixed after the initial scan. The connection between the tip 35 and valve 80 can be either locking, screwing, twisting or any other means of connecting the tubes 20 end into the solenoid 80 end.

Although the features, functions, components, and parts have been described herein in accordance with the teachings of the present disclosure, the scope of coverage of this patent is not limited thereto. On the contrary, this patent covers all embodiments of the teachings of the disclosure that fairly fall within the scope of permissible equivalents.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A portable custom cosmetic pigment dispensing device comprising:
   a main body portion housing a controller; and
   a hollow body portion configured to attach to an end region of the main body, the hollow body portion housing a component assembly comprising a color sensor configured to measure a skin color of a user by:
   capturing, by the color sensor, multiple, separate color components of light reflected off of the skin of the user; and
   determining, subsequent to capturing, the skin color of the user based on the captured multiple color components,
   wherein the hollow body portion is portable and configured to be placed adjacent to the skin of the user during capturing, by the color sensor, of the separate color components, and
   wherein the hollow portion is configured to transmit information about the determined skin color to the controller housed in the main body portion; and
   wherein the controller is configured to execute processing operations, from computer-executable instructions stored on a memory, that comprise:
   determining color values based on the colors of the reflected light,
   converting the color values to cosmetic pigment values of a color scale, and
   causing the portable custom cosmetic pigment dispensing device to create a customized cosmetic pigment sample based on the cosmetic pigment values.

2. The portable custom cosmetic pigment dispensing device of claim 1,
   wherein determining the color values comprises:
   for each of the color values of the skin color of the user:
   determining a voltage value representative of each color value; and
   converting the voltage value to a digital value.

3. The portable custom cosmetic pigment dispensing device of claim 1 further comprising:
   multiple pigment reservoirs,
   wherein converting the color values to cosmetic pigment values comprises:
   determining digital values representative of the color values;
   determining, as the cosmetic pigment values, quantities for the color values, based on an evaluation of the digital values; and
   determining, based on the quantities of the color values associated with the color scale, one or more amounts of time to dispense cosmetic pigments stored in the multiple pigment reservoirs.

4. The portable custom cosmetic pigment dispensing device of claim 1 further comprising:
   multiple pigment reservoirs,
   wherein converting the color values to cosmetic pigment values comprises:
   determining digital values representative of the color values;
   determining quantities for the color values based on an evaluation of the digital values; and determining, based on the quantities for the color values, one or more amounts of time to dispense cosmetic pigments stored in the multiple pigment reservoirs, wherein determining the quantities for the color values comprises:

applying a weighting algorithm, programmed into the memory, that modifies the color values to generate the cosmetic pigment values, wherein the cosmetic pigment values include weighting values for the color values.

5. The portable custom cosmetic pigment dispensing device of claim 1 further comprising:

a pigment reservoir configured to store a cosmetic pigment, wherein the controller is configured to execute processing operations, from computer-executable instructions stored on the memory, that further comprise:

determining, based on a weighting value, a time period to dispense the cosmetic pigment from the pigment reservoir; and causing the pigment reservoir to dispense the cosmetic pigment for the time period to create the customized cosmetic pigment sample.

6. The portable custom cosmetic pigment dispensing device of claim 1 further comprising:

a pigment reservoir configured to store a cosmetic pigment; and an actuator coupled to the pigment reservoir, wherein the controller is configured to cause the actuator to open and close the pigment reservoir, and wherein the actuator is selected from a group comprising a pump, a valve, a motor, or a switch.

7. The portable custom cosmetic pigment dispensing device of claim 1 further comprising:

an electronic display that is configured to display a graphical user interface;

wherein the controller is configured to execute processing operations, from computer-executable instructions stored on the memory, that further comprise:

activating the component assembly; and in response to the component assembly being activated, presenting, on the graphical user interface, a request for the user to cause the component assembly to measure the separate color components of light reflected off of the skin of the user by the color sensor; and presenting, on the graphical user interface, instructions for the user to place the color sensor, of the component assembly, proximate to a skin portion of the user.

8. The portable custom cosmetic pigment dispensing device of claim 1 further comprising:

an electronic display that is configured to display a graphical user interface, wherein the controller is configured to execute processing operations, from computer-executable instructions stored on the memory, that further comprise:

presenting, on the graphical user interface, a sample visualization of the customized cosmetic pigment sample; and requesting an approval of a correctness of the customized cosmetic pigment sample based on the sample visualization.

9. The portable custom cosmetic pigment dispensing device of claim 1 further comprising:

multiple pigment reservoirs; and an electronic display that is configured to display a graphical user interface, wherein the controller is configured to execute processing operations, from computer-executable instructions stored on the memory, that further comprise:

presenting, on the graphical user interface, a sample visualization of the customized cosmetic pigment sample;

requesting an approval of a correctness of the customized cosmetic pigment sample based on the sample visualization;

provide a control command to one or more of the multiple pigment reservoirs in response to the approval of the correctness of the customized cosmetic pigment sample; and presenting, on the graphical user interface, an indication that a mixture, representative of the customized cosmetic pigment sample, is ready for use.

10. The portable custom cosmetic pigment dispensing device of claim 1, wherein the controller is configured to execute processing operations, from computer-executable instructions stored on the memory, that further comprise: generating a mixture representative of the customized cosmetic pigment sample; and outputting the mixture for user application.

11. The portable custom cosmetic pigment dispensing device of claim 1 further comprising:

multiple pigment reservoirs; and an electronic display that is configured to display a graphical user interface, wherein the controller is configured to execute processing operations, from computer-executable instructions stored on the memory, that further comprise:

receiving, through the graphical user interface, a request to lighten or darken the customized cosmetic pigment sample;

in response to the receiving of the request to lighten or darken the customized cosmetic pigment sample, providing a control command to the multiple pigment reservoirs configured to modify a distribution of colors for the customized cosmetic pigment sample based on the request to lighten or darken the customized cosmetic pigment sample;

generating a modified mixture for the customized cosmetic pigment sample; and outputting the modified mixture for user application.

12. The portable custom cosmetic pigment dispensing device of claim 1 further comprising:

a power source operatively connected to power the portable custom cosmetic pigment dispensing device, wherein the power source is selected from a group comprising:

a battery, or an alternating current (AC) power plug.

13. A method performed by a portable custom cosmetic pigment dispensing device, the method comprising:

measuring, by a color sensor of the portable custom cosmetic pigment dispensing device, a skin color of a user of the portable custom cosmetic pigment dispensing device, the measuring comprising:

capturing, by the color sensor, multiple, separate color components of light reflected off of the skin of the user; and determining, subsequent to capturing, the skin color of the user based on the captured multiple color components, wherein:

the portable custom cosmetic device comprises a main body portion housing a controller and a hollow body portion configured to attach to an end region of the main body, the hollow body portion housing the color sensor, the hollow body portion is portable and configured to be placed adjacent to the skin of the user during capturing of the separate color components, and the hollow portion is configured to transmit information about the determined skin color to the controller housed in the main body portion;

identifying, by the controller, color values based on the colors of the reflected light;

converting, by the controller, the color values to cosmetic pigment values associated with a color scale; and causing, by the controller, the portable custom cosmetic pigment dispensing device to create a customized cosmetic pigment sample based on the cosmetic pigment values associated with the color scale.

14. The method of claim 13 further comprising, for each color of the color values of the skin color of the user:

determining a voltage value representative of each of the color values; and converting each voltage value to a digital value.

15. The method of claim 13, wherein converting the color values to cosmetic pigment values comprises:

determining digital values representative of the color values;

determining, as the cosmetic pigment values, quantities for the color values, based on an evaluation of the digital values; and determining, based on the quantities of the color values, one or more amounts of time to dispense cosmetic pigments stored in multiple pigment reservoirs of the portable custom cosmetic pigment dispensing device.

16. The method of claim 13, wherein converting the color values to cosmetic pigment values comprises:

determining digital values representative of the color values;

determining quantities for the color values based on an evaluation of the digital values; and determining, based on the quantities for the color values, one or more time periods to dispense cosmetic pigments stored in multiple pigment reservoirs.

17. A computer-readable storage medium, excluding transitory signals and carrying instructions, which, when executed by at least one data processor of a system, cause the system to:

measure, by a color sensor of the system, color values of a skin color of a user of a portable custom cosmetic pigment dispensing device, the measuring comprising:

capturing, by the color sensor, multiple, separate color components of light reflected off of the skin of the user; and determining, subsequent to capturing, the color values of the skin color of the user based on the captured multiple color components, wherein:

the system comprises a main body portion housing a controller and a hollow body portion configured to attach to an end region of the main body, the hollow body portion housing the color sensor, the hollow body portion is portable and configured to be placed adjacent to the skin of the user during capturing of the separate color components, and the hollow portion is configured to transmit information about the determined skin color to the controller housed in the main body portion;

convert, by the controller, the color values to cosmetic pigment values associated with a color scale; and cause, by the controller, the portable custom cosmetic pigment dispensing device to create a customized cosmetic pigment sample based on the cosmetic pigment values.

18. The computer-readable storage medium of claim 17 further comprising:

receiving an input from the user to activate a component assembly of the portable custom cosmetic pigment dispensing device; and in response to the component assembly being activated, presenting, on a graphical user interface coupled to the portable custom cosmetic pigment dispensing device, a request for the user to cause the component assembly to measure the separate color components of the light reflected off of the skin of the user by the color sensor; and presenting, on the graphical user interface, instructions for the user to place the color sensor, of the component assembly, proximate to a skin portion of the user.

19. The computer-readable storage medium of claim 17 further comprising:

presenting, on a graphical user interface of the portable custom cosmetic pigment dispensing device, a sample visualization of the customized cosmetic pigment sample; and presenting, on the graphical user interface, a request for approval of a correctness of the customized cosmetic pigment sample based on the sample visualization.

\* \* \* \* \*